United States Patent
Smith (10) Patent No.: US 7,221,815 B2
(45) Date of Patent: May 22, 2007

(54) OPTICAL SENSOR MULTIPLEXING SYSTEM

(75) Inventor: Ronald H. Smith, Rockville, MD (US)

(73) Assignee: Optelecom - NKF, Germantown, MD (US)

( * ) Notice: Subject to any disclaimer, the term of this patent is extended or adjusted under 35 U.S.C. 154(b) by 0 days.

(21) Appl. No.: 11/149,353

(22) Filed: Jun. 10, 2005

(65) Prior Publication Data
US 2005/0281505 A1    Dec. 22, 2005

Related U.S. Application Data

(60) Provisional application No. 60/578,857, filed on Jun. 14, 2004.

(51) Int. Cl.
*G02B 6/42* (2006.01)
*H04J 14/02* (2006.01)

(52) U.S. Cl. .......................................... 385/13; 398/83

(58) Field of Classification Search .................. None
See application file for complete search history.

(56) References Cited

U.S. PATENT DOCUMENTS 6,898,338 B2 * 5/2005 Kersey et al. ................ 385/13

* cited by examiner

*Primary Examiner*—Michelle Connelly-Cushwa
*Assistant Examiner*—Jerry T. Rahll
(74) *Attorney, Agent, or Firm*—Hoffman, Wasson & Gitler, P.C.

(57) ABSTRACT

A method and system producing and transmitting pulsed or continuous wave signals through one or more optical fibers to a plurality of remote sensors provided in a hostile environment. The produced signals transmitted along one of the optical fibers would be demultiplexed and transmitted to separate sensors. The sensors would then modulate these signals which would then be combined onto a single output optical fiber which is to be analyzed. A spectrometer or other signal processing device, generally included in a shielded environment, would be utilized to process the modulated signals.

13 Claims, 7 Drawing Sheets

WDM Sensor Network with Multi-Channel Receiver

FIG. 1

PRIOR ART

OPTICAL SENSOR MULTIPLEXING SYSTEM

CROSS-REFERENCED APPLICATION

The instant application is based upon U.S. provisional patent application Ser. No. 60/578,857, filed Jun. 14, 2004.

FIELD OF THE INVENTION

The present invention is directed to the field of remotely determining the condition of various parameters sensed by sensors which may reside in a hostile environment.

BACKGROUND OF THE INVENTION

Various sensors are currently utilized in various fields, such as avionics for control, as well as in the field of vehicle health monitoring. Hydraulic and Fly-by-Wire aircraft require the constant monitoring of various parameters, such as, but not limited to, pressure, temperature, voltage, current, actuator position used for control, safety and maintenance monitoring.

Current photonic technologies can be applied to various airborne vehicle management and control systems resulting in a significant reduction in weight, volume and cost as well as an inherent immunity to electromagnetic interference. A passive fiber optic sensor bundle, utilizing a single optically differentiating receiver array and incorporating various devices, such as temperature, pressure, voltage, current and motor/actuator position sensors into a single wavelength division multiplex (WDM) multimode fiber reduces the number of fibers required for vehicle operations and health monitoring.

Figure 1:
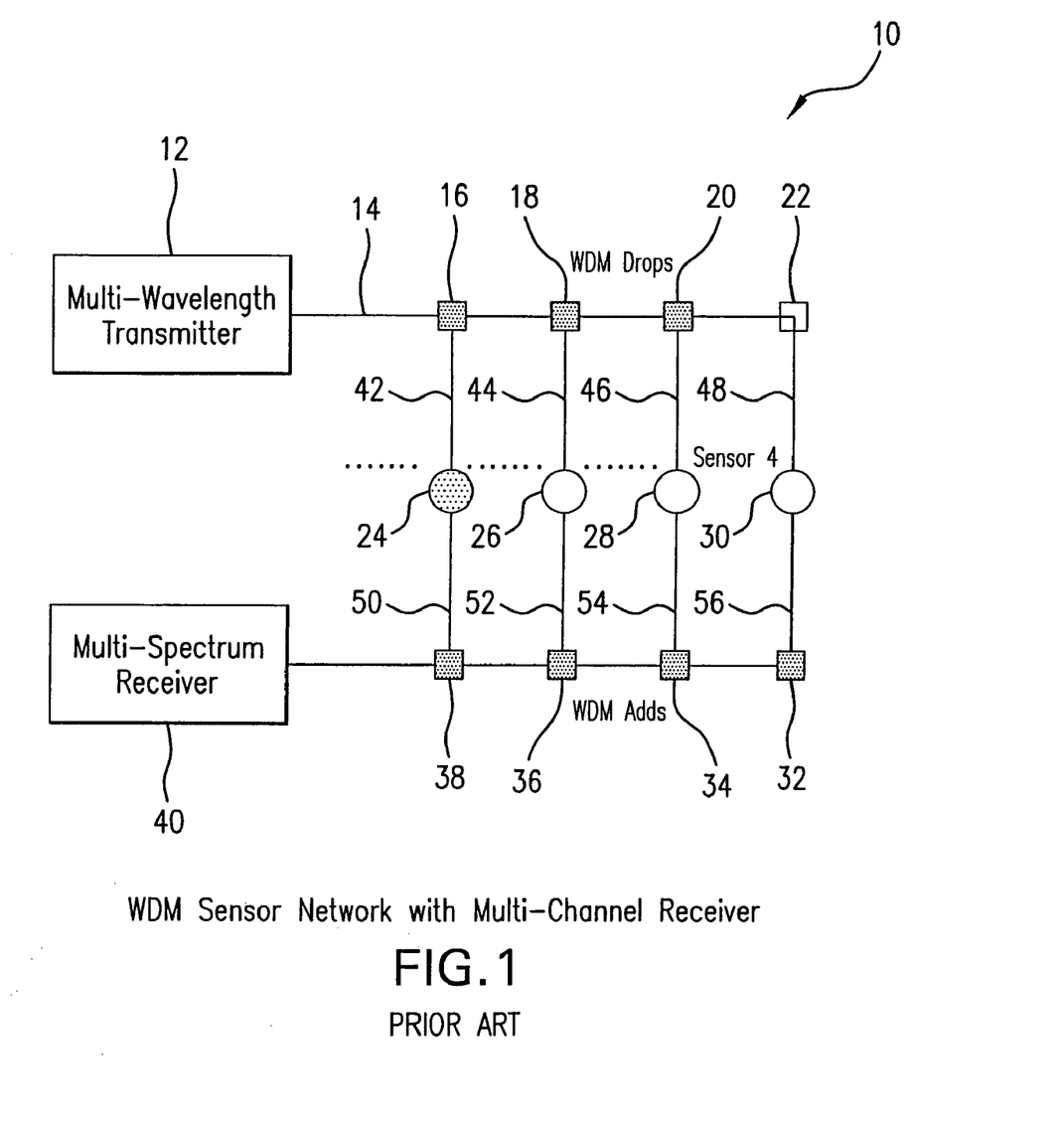
FIG. 1 is a block diagram showing a prior art WDM sensor network with a multi-channel receiver.

A prior art system is illustrated in FIG. 1. This system includes a multi-wavelength transmitter 12 transmitting a spectrum of wavelengths over a single optical fiber 14. A plurality of WDM drop taps 16, 18, 20, and 22 are provided along the length of a first portion of the optical fiber line 14. Each of these WDM drop taps is associated with a particular sensor 24, 26, 28 and 30. Each of these sensors would be used to monitor the condition of various parameters or control devices. Each of the WDM drop taps would be sensitive to a particular narrow wavelength range and would split this narrow wavelength from the multi-wavelength spectrum to be transmitted to its particular sensor over optical fiber lines 42, 44, 46 and 48. Each of the sensors would modulate the narrow wavelength optical signal indicative of the parameter or control device monitored. These signals would then be sent over optical fiber lines 50, 52, 54, 56 to their respective WDM add taps 32, 34, 36 and 38. These combined, modulated signals would then be transmitted over an optical fiber line 60 to a multi-spectrum receiver 40. At that point, the signals received by the receiver 40 would then be analyzed.

The system shown in FIG. 1 including a centralized receiver array can be incorporated into a central control unit computer interface providing enhanced electromagnetic interference protection and supporting a modular repair/replacement strategy, while reducing the weight and volume of the sensing system. Various methods associated with a wide range of measurement parameters have been developed that would result in absolute, non-incremental, calibrated read-out of the particular physical environment.

The various sensor structures are compact, tolerant of extreme environments, and provide the accuracy, repeatability and response times required for optical fiber based control systems.

It is important to note that the prior art system illustrated in FIG. 1 does not utilize a spectrometer to analyze the results garnered from the myriad number of sensors provided in the system. Additionally, the prior art system does not utilize a time division multiplexing system for collecting the aforementioned data. Furthermore, the prior art system does not utilize an array of optical fiber lines.

SUMMARY OF THE INVENTION

The present invention is directed to a system and method of sensing various parameters as well as the conditions of various actuators provided in a hostile environment where it is important to protect against electromagnetic interference (EMI). One or more optical fibers are used to transmit wavelength division multiplex (WDM) or time division multiplex (TDM) signals between a transmitter device and a receiver. A portion of the transmitted signals are transmitted through one of a number of sensors, which in turn would modulate its respective signal and return the signal to a receiver for analysis. It is noted that based upon the type of signal transmitted from the transmitter, the modulated signals could be analyzed by an optical spectrometer. This is particularly true if WDM signals are utilized.

It is therefore an object of the present invention to provide a multiplexed signal output from a transmitter over an optical fiber or optical waveguide. Portions of this multiplexed output would then be diverted to separate sensors which in turn would modulate that portion of the signal diverted to those sensors. These modulated signals would then be combined and sent to a receiver for analysis.

Another object of the present invention is to produce a system in which the demultiplexing and analysis of the modulated signals would utilize an optical spectrometer having sensitive electronic detector array components located within a benign environment and optically isolated from sensor elements in a manner designed to make the system particularly conducive to the tolerance of extreme environments.

Yet another object of the present invention would be to provide a system utilizing both WDM and TDM technology, the use of the WDM or TDM technology dependent upon the particular sensor.

A further object of the present invention would be to develop both a system and method in which only a portion of the broad spectrum of light produced by the transmitter would be transmitted to a particular sensor.

A further object of the present invention would be to produce a method and system in which emitters having disparate spectral and pulse timing characteristics are combined into a single system.

Yet a further object of the present invention would be a method and system in which a plurality of optical fibers transmitting modulated signals are introduced into a single spectrometer demultiplexer.

BRIEF DESCRIPTION OF THE DRAWINGS

A fuller understanding of the present invention and the features and benefits thereof, will be accomplished upon review of the following detailed description together with the accompanying drawings, in which.

DESCRIPTION OF THE PREFERRED EMBODIMENT

Figure 2:
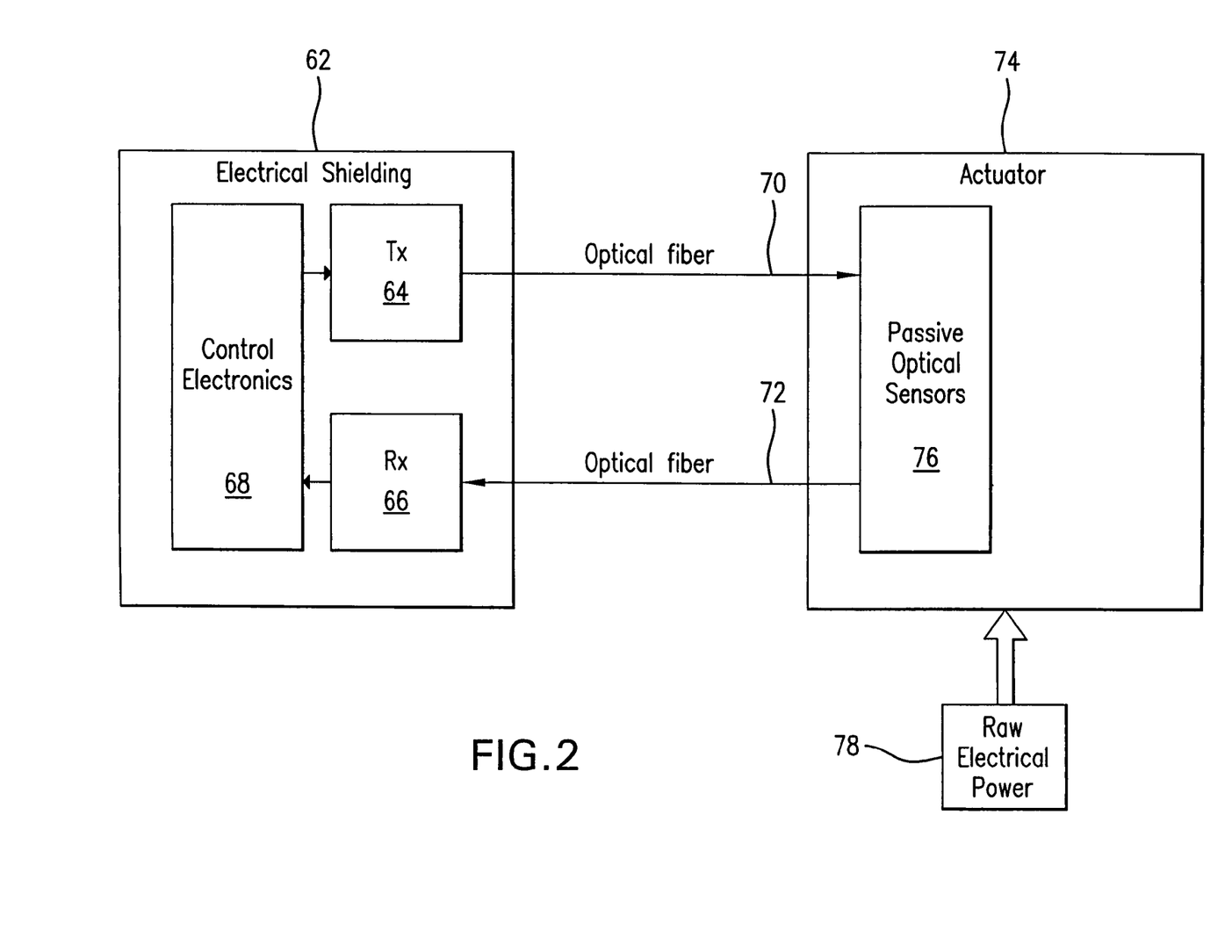
FIG. 2 is a block diagram showing the generalized structure of the present invention.

The system of the present invention, as illustrated with respect to FIG. 2, shows a block diagram of a control system including passive optical sensors 76 provided within an actuator 74. As can be appreciated, particularly when utilized within the hostile environment of avionics, a multiplicity of sensors would be utilized to monitor various control devices and parameters. It is also noted that various other parameters can be monitored, such as pressure and temperature, without the need of passive optical sensors. Various elements of the control system connected to the passive optical sensors 76 which are susceptible to EMI should be provided within electrical shielding 62. These elements would include a transmitter 64, a receiver 66, as well as various control and analysis electronics 68. It is noted that an optical fiber or waveguide 70 would be utilized to transmit an optical spectrum from the transmitter 64 to the passive optical sensors 76. Additionally, an optical fiber or waveguide 72 would be included for transmitting modulated spectrum signals from the passive optical sensors 76 to the receiver 66. It is noted that the optical fiber or waveguides 70, 72 could be constructed from a polymer.

All of the portions of the system which are outside of the carefully shielded enclosure 62 must be able to sustain EMI without losing their functionality. This is accomplished by utilizing a raw electrical power source 78 to drive various components, such as shielded motors, and by insuring that the motor feedback sensors all include passive optical sensors with no electronic elements which would be effected by the intense electromagnetic field. The utilization of optical fibers 70, 72 to connect the passive optical sensors 76 with the components provided within the electrical shielding 62 effectively isolates these two zones, since the optical fiber is non-conductive of the EMI. Immunity to the electromagnetic interference provides a major benefit in this environment in which the sensors for actuator control are connected through a waveguide medium maintaining immunity to electromagnetic interference of the components provided within the electrical shielding 62.

Figure 3:
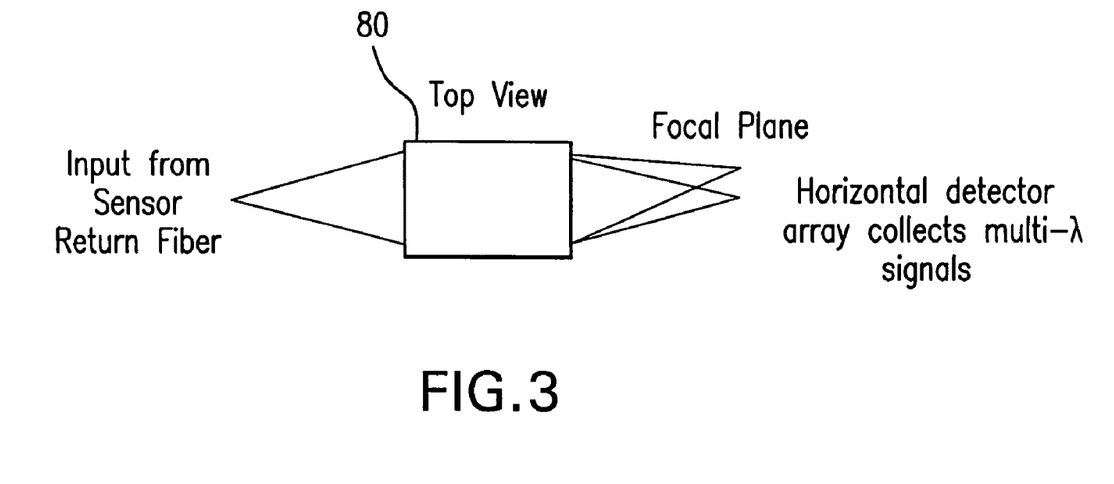
FIG. 3 is a block diagram showing the top view of a spectrometer utilized by the present invention.
Figure 4:
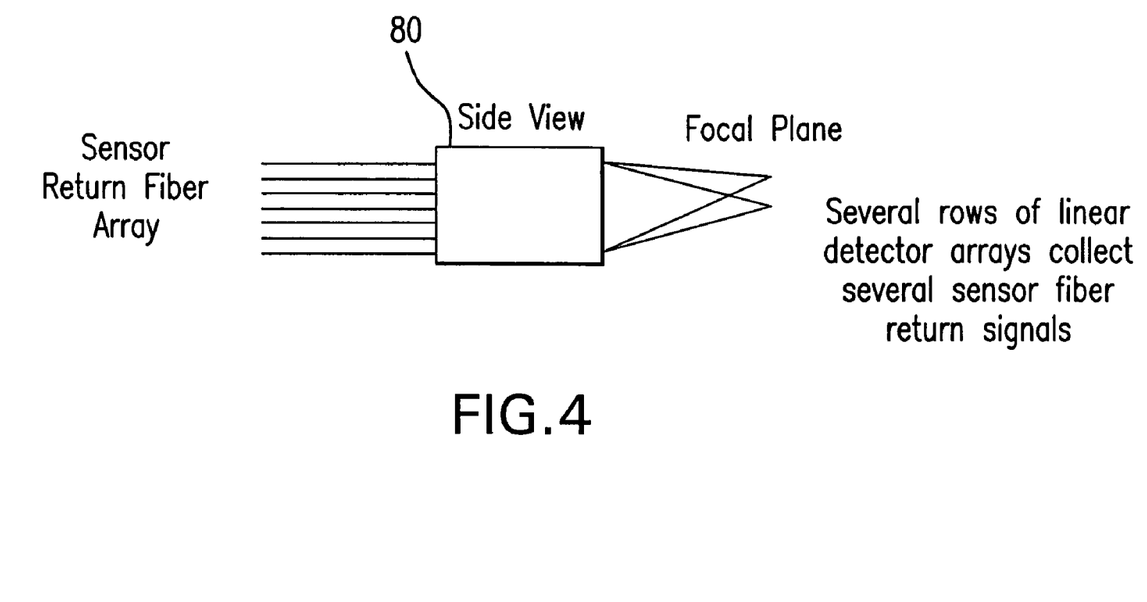
FIG. 4 is a side view of the spectrometer shown in FIG. 3.

FIGS. 3 and 4 provide top and side views of a two-dimensional spectrometer utilized in the control electronics 68 shown in FIG. 2. The horizontal dimension is devoted to spectral separation, while the vertical dimension accommodates multiple parallel sensor array inputs to a single spectrometer receiver. As shown in the drawings, the horizontal detector array would collect a multi-wavelength array of signals. The several rows of linear detector arrays would collect several sensor fiber return signals on each of the optical fibers. This particular spectrometer 80 is used in the prior art to allow out of plane imaging onto a two-dimensional camera focal plane which in turn provides capture of independent spectral data from a plurality of sensing points within a scattering chamber, corresponding to the plurality of input fibers utilized by the present invention and further shown in FIG. 5. The in plane dimension of the focal plane which in prior art is devoted to imaging the spectra associated with the various scattering points, corresponds to the wavelength demultiplexing shown in FIG. 3.

Figure 5:
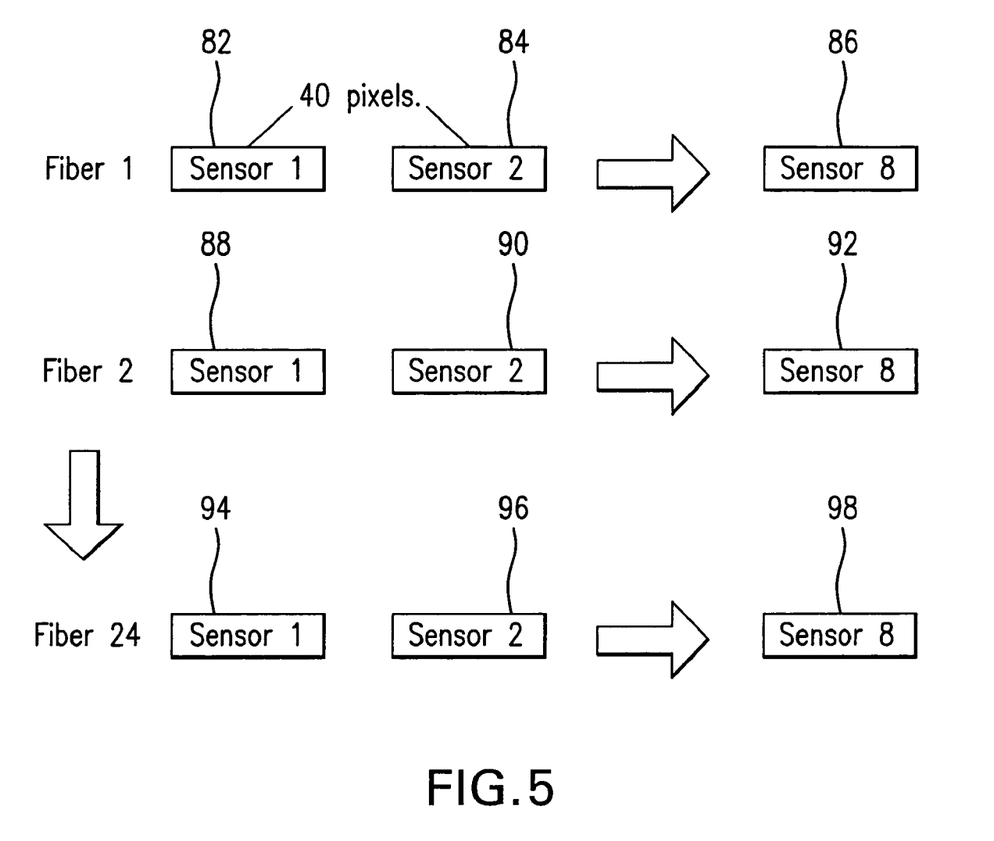
FIG. 5 is a spectrometer sensor array format showing the use of a plurality of 40 pixel detector array elements.

As illustrated with respect to FIG. 5, a plurality of detector array elements 82, 84, 86, 88, 90, 92, 94, 96 and 98 are provided. Detector array elements 82, 84 and 86 are devoted to sensor modulated optical signals carried to the spectrometer on a first fiber optical fiber or waveguide. Detector array elements 88, 90 and 92 are devoted to sensor modulated optical signals carried to the spectrometer on a second optical fiber waveguide and detector array elements 94, 96 and 98 are devoted to sensor modulated optical signals carried to the spectrometer on yet a third optical fiber or waveguide.

Each of the sensors carried on separate fibers, such as sensors 82, 84 and 86 on fiber 1, sensors 88, 90 and 92 on fiber 2 and sensors 94, 96, 98 provided on fiber 24 are characterized to extend on an X axis. Each of the fibers themselves are displaced from each other in a direction orthogonal to the X axis, along a Y axis.

The spectrometer 80 illustrated in FIGS. 3 and 4 would include individually addressable detector elements or sensors providing high bandwidth output and high density arrays to maximize resolution and simultaneous detection of optical modulation effects originating in multiple sensor transducers. FIG. 5 illustrates the use, for example, of a control system architecture employing 192 sensors. This array includes eight sensors optically multiplexed onto a single fiber in each of 24 fiber optic waveguides, resulting in parallel simultaneous access to 192 sensors. Each of the fibers would be transmitted to a separate actuator motor. Therefore, as illustrated in FIG. 5, 24 actuator motors would be employed. As can be appreciated, the exact number of fiber optic waveguides, as well as the exact number of sensors associated with each of the fiber optic waveguides, can be altered based upon the specific environment of use. Each of the detector array elements shown in FIG. 5 are optical in nature and each of the detector array elements is provided with 40 pixels. Obviously, the number of pixels in each of the detector array elements can be changed. As can be appreciated, based upon the type of parameters detected and monitored by each of the sensors, it is not imperative that each of the sensors be directed to a spectrometer receiver. For example, a voltage or current sensor might employ demultiplexing time domain separation of two optical signals from different emitters instead of a spectrometer. It is noted that it is also immaterial to utilize a particular type of optical sensor. Examples of optical sensors that are employed would be Fabry-Perot interferometers, side reflecting Bragg gratings, in-fiber Bragg gratings, as well as Mach-Zehnder interferometers. The ratio of absorbance on two wavelengths may be modulated by a sensed parameters. Furthermore, some or all of the sensors can embody thin film reflector elements having discernible spectral transmission differences.

As can be appreciated, when the sensor array shown in FIG. 5 is introduced to the spectrometer 80 shown in FIGS. 3 and 4, the output beams of each of the waveguides would be imaged onto a rectangular array of detector elements. In this instance, the different rows of the rectangular detector array are associated with the different waveguide output beams. Consequently, the spectral content of each of the optical waveguides is analyzed by the row associated with that particular waveguide output.

The WDM sensor array system of the present invention would require multi-spectrum emitters to provide the tap wavelengths for the multiple transducers or sensors. Improved system flexibility is achieved by incorporating emitters with arbitrary pulse amplitudes and durations. One approach is to utilize a simple power combiner coupled to the sources that have the desired composite spectrum. Variable combining ratios accommodate variable emitter power. A potential drawback of the power combiner approach is that the output is typically reduced in power. This drawback may be mitigated by incorporating a power splitter and power combiner resulting in a multiplicity of multi-spectrum output lines which conserve a multiplicity of sensor arrays.

Figure 6:
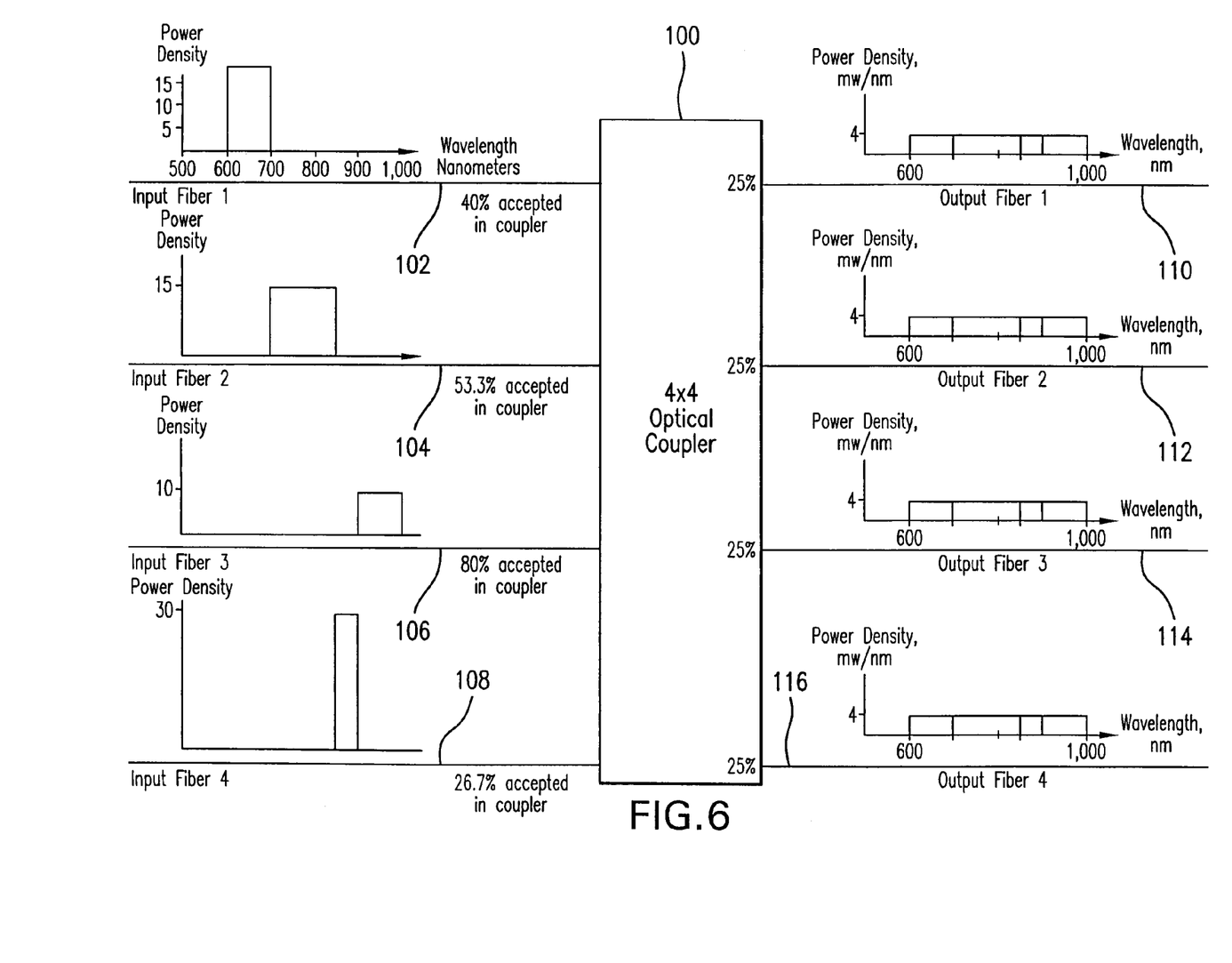
FIG. 6 shows an example of different optical power levels and spectral characteristics of a plurality of optical emitters which are combined in a 4×4 optical power coupler.

FIG. 6 shows an example in which different optical power levels and spectral characteristics of emitters are coupled to a 4×4 optical coupler 100. As can be appreciated, the number of input fibers as well as the number of output fibers would dictate the type of optical coupler utilized. Therefore, in general an n×n optical coupler would be employed with n equal to the number of input/output optical fibers. As illustrated, the input power provided on each of the input fibers 102, 104, 106 and 108 is different in both wavelength as well as power density. These variable input powers are compensated by accepting a variable percentage of the power available on each of the fiber input lines for transfer to the fiber output lines 110, 112, 114 and 116. For example, as shown in FIG. 6, 40% of the power on optical input fiber line 102 would be accepted by the optical coupler 100. In this same manner, 53.3% of the power provided on input optical fiber line 104, 80% of the power provided on optical fiber line 106 and 26.7% of the power provided on input optical fiber line 108 would be accepted by the optical coupler 100. The output fibers are arranged to distribute the combined optical signals with equal total optical power in each fiber. The resultant output spectrum provided on fiber output lines 110, 112, 114 and 116 would be equal in total optical power as well as having an equal power density.

An additional element of flexibility is available in the composite emitter design based upon pulsing some, but not necessarily all, of the emitters. If several emitters are pulsed, different pulse rates and duty cycles may be used to fit the characteristics of the individual sensors. An illustrative example of mixing emitters having various wavelengths and emitted characteristics tailored to different sensor requirements are provided in Table I, as well as illustrated with respect to FIG. 7:

TABLE I

Figure 7:
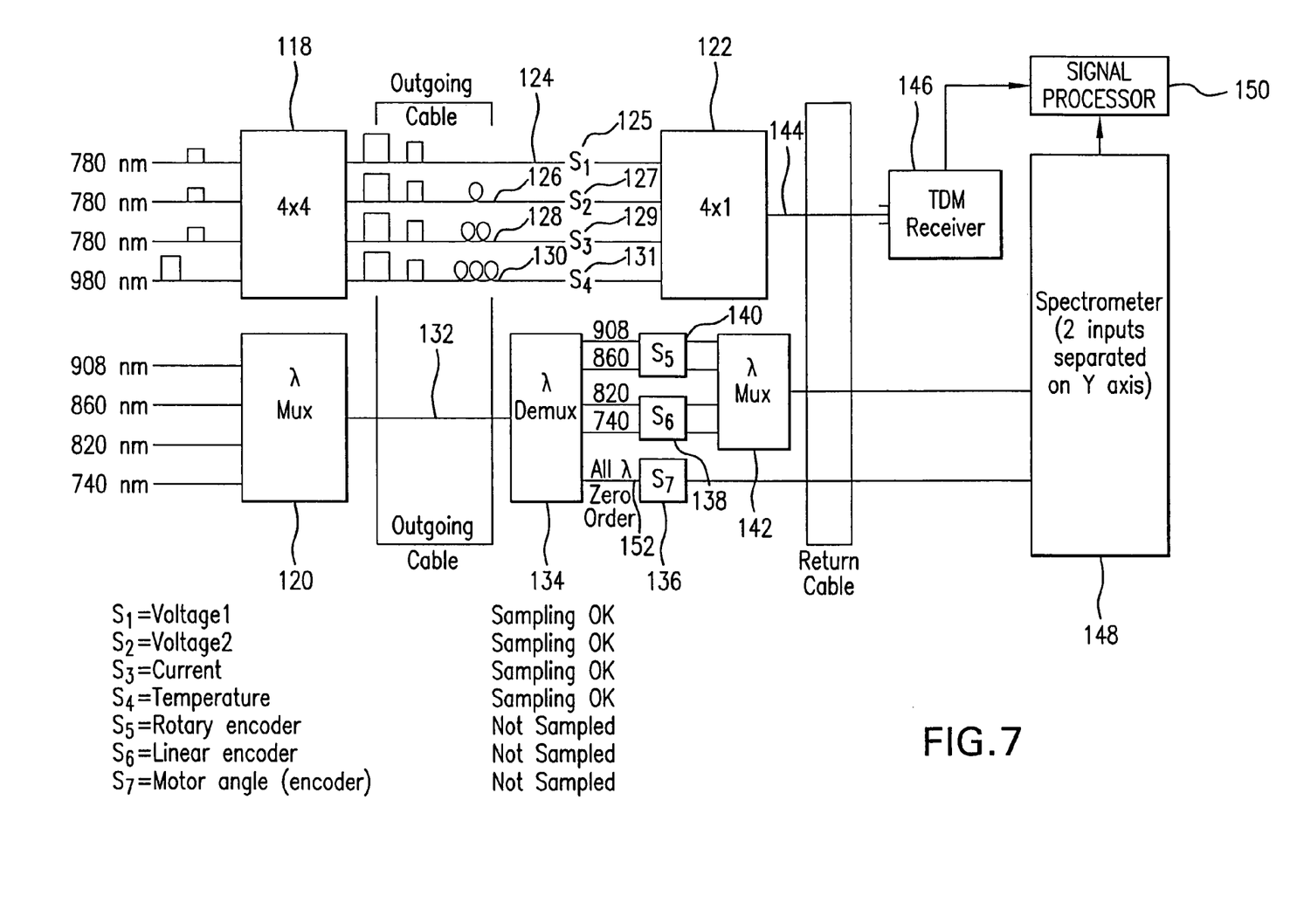
FIG. 7 illustrates a system using both WDM and TDM multiplexing.

| Sensor Number | Sensor Function | Emitter: Pulsed or CW | Wavelengths Used, nm |
|---|---|---|---|
| S1 | Voltage 1 | Pulsed | 980 and 780 |
| S2 | Voltage 2 | Pulsed | 980 and 780 |
| S3 | Current | Pulsed | 980 and 780 |
| S4 | Temperature | Pulsed | 980 and 780 |
| S5 | Shaft Rotary encoder | CW | 908 and 860 |
| S6 | Linear encoder | CW | 820 and 740 |
| S7 | Motor phase rotary encoder | CW | 908, 860, 820 and 740 |

FIG. 7 illustrates an embodiment in which both WDM and TDM are utilized. In this example, Sensors S1 125, S2 127, S3 129 and S4 131 are used to measure the various parameters shown in Table I. All of these sensors use, for example, pulsed emitters at 780 nm and 980 nm wavelengths. These two wavelengths are combined in the manner shown in FIG. 7 utilizing a 4×4 optical coupler 118, thereby combining the two wavelengths 780 nm and 980 nm onto four output optical fibers 124, 126, 128 and 130. The two wavelengths are separated in the time domain by a difference in the emitted pulse times of the two wavelengths. As shown in FIG. 7, three emitters at the 780 wavelength are combined with one emitter at the 980 wavelength. The pulse timing of the three 780 nm emitters is identical, having the effect of tripling the optical power at 780 nm on each of the four output fibers 124, 126, 128 and 130 relative to that which would be present only if one 780 nm emitter were to be utilized. This power adding feature is used to more nearly balance the low power available, for example, from VOSEL 780 nm lasers with substantially higher power available from the one 980 nm laser diode. Although they appear to be equal, the length of the optical fibers between the 4×4 optical coupler 118 and each of the sensors S1, S4, is deliberately made different so that signals detected after passing through one of the four sensors will not overlap in time with any of the signals after passing through a different sensor. This nonoverlap condition is achieved, for example, by introducing no additional delay on the fiber passing through sensor S1, a delay of ΔT in the fiber through sensor S2, a delay of 2ΔT in the fiber through sensor S3 and a delay of 3ΔT in the fiber through sensor S4. It is important that ΔT must be large enough to encompass the time occupied by two pulses, such as the 980 nm emitter pulse, followed by the 780 nm emitter pulse. In this manner, no pulse pair will overlap with any other and the four sensor output fibers can be coupled to a single fiber carrying all of the sensor signals to a 4×1 optical combiner 122. In other words, after the signal from each of these four optical fibers 124, 126, 128 and 130 is modulated by its respective sensor 125, 127, 129 and 131, the signal provided on output fiber line 144 after it exits the optical combiner 122 would be a time division multiplexed signal. This signal would then be transmitted to a time division multiplex receiver 146 and then to a signal processor 150 which separates the four sensor signals based upon their different detection times, and then analyzes these signals.

The same system which utilized a TDM approach provided with pulse wavelengths could also utilize a continuous wave (CW) approach. As shown in the lower portion of FIG. 7, emitters at wavelengths 908 nm, 860 nm, 820 nm and 740 nm are combined in a single wavelength division multiplexer 120 thereby producing a continuous wave spectrum of these four wavelengths on outgoing optical cable 132. At a remote actuator, this wavelength spectrum is separated by a wavelength demultiplexer 134 from one another with minimal crosstalk, but also resulting in residual power from all four of the wavelengths provided on the cable 132. This could occur, for example, by the utilization of a grating spectrometer device where the diffracted wavelengths are clearly separated and zero order undiffracted light is collected on a single fiber. This is illustrated by sensors S5 140 and S6 138. Sensor S5 would utilize the 908 nm and 860 nm wavelengths to produce an output signal indicative of the status of sensor S5. Sensor S6 would similarly use wavelengths 820 nm and 740 nm to produce its particular signal. The fiber containing the residual power from all four wavelengths could be directed through optical fiber 152 and then directed to sensor S7. Light passing through sensors S5 140 and S6 138 is wavelength division multiplexed by multiplexer 142 and is transmitted to a receiving spectrometer 148 provided in the control station. This spectrometer would demultiplex the four wavelengths and would direct a signal associated with sensors S5 140 and S6 138 to the appropriate signal processing electronics. The fiber from sensor S7 136 would also be transmitted to the spectrometer 148, where the wavelengths were separated and the resulting signals are also forwarded to a signal processor 150. As shown in this example, sensor S7 136 monitors a motor angle sensor which may, for example, replace a plurality of Hall effect sensors used to sense motor phase with a plurality of selected wavelength filters passing different wavelengths with different wavelengths assigned to different motor phase sensing angles.

As can be appreciated from the example illustrated in Table I and FIG. 7, a combination of WDM and TDM signals can be employed in a single hostile environment, such as avionics.

Figure 8:
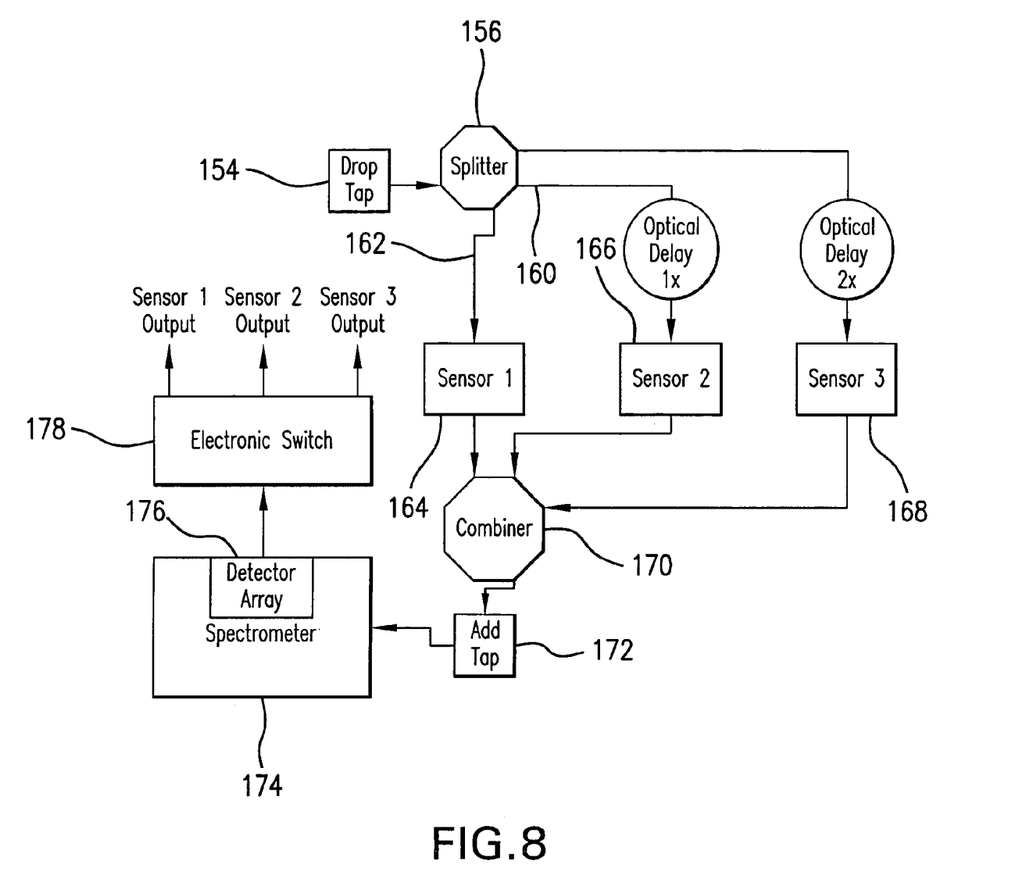
FIG. 8 shows a WDM sensor array with time division multiplexing.

A more complete depiction of the time domain multiplexing illustrated in the top portion of FIG. 7 is shown in FIG. 8. Although the signals transmitted from the 4×4 optical coupler 118 of FIG. 7 are transmitted on separate optical fiber lines 124, 126, 128 and 130, a TDM signal can be transmitted on a single output line which would be directed to a drop tap 154 which in turn would direct the signal to a signal splitter 156 which transmits separate signals to sensors 164, 166, 168 through lines 162, 160 and 158, respectively. As previously described, the length of the lines 158, 160 and 162 would be different resulting in an optical delay between the splitter 156 and the sensors 164, 166 and 168. Each of the sensors would then modulate the optical signal which would then be transmitted to a combiner 170 providing a single TDM signal to an add tap 172 which would in turn direct the signal to a spectrometer 174 having a detector array 176. The time delayed sensor signals would pass through the spectrometer 174, through a detector array 176 and then to an electronic routing switch 178. It is noted that, similar to the embodiment illustrated in FIG. 7, the TDM signal need not pass through the spectrometer 174 but can be sent directly to a signal processor and then to the electronic switch 178.

It is noted that although a single drop tap 154 and a single add tap 172 are shown in FIG. 8, a multitude number of these drop taps and add taps can be utilized.

It is further noted that the optical combiner 12 of FIG. 1 may employ different combining ratios for the different input optical fiber waveguides to accommodate different emitted power from a plurality of optical emitters. The differences of this emitted power would produce a desired degree of output spectral uniformity. It is also noted that in an instance in which pulse emitters are utilized, these emitters would employ different pulse rates and/or duty cycles matched to the needs of its associated sensors.

Thus, an optical sensor multiplexing system has been prescribed. It will readily be apparent to those skilled in the art that various changes and modifications of an obvious nature may be made without departing from the spirit of the invention, and all such changes and modifications are considered to fall within the scope of the invention as defined by the appended claims.

What is claimed is:
1. A system for determining the values of a plurality of sensors provided in a hostile environment, comprising:
a plurality of optical emitters, each optical emitter producing a particular narrow band of wavelengths of optical energy;
a first waveguide;
a second waveguide;
a multiplexer in connection with said plurality of optical emitters for producing a wavelength division multiplexed spectrum combining the narrow band of wavelengths produced by each of said optical emitters to be transmitted along said first waveguide;
a plurality of optical drop taps periodically provided along said first waveguide, each of said optical drop taps associated with one of said sensors, each of said optical drop taps sensitive to the narrow band of wavelength of one of said optical emitters, thereby diverting only a narrow band of wavelengths from said spectrum to its respective sensor;
a plurality of add taps periodically provided along said second waveguide, each of said optical add taps associated with one of the sensors for receiving a signal from the sensor, modulating a narrow band of wavelengths transmitted to the sensor from one of said optical drop taps; and
a spectrometer receiving all of the wavelength division multiplexed spectrum, a portion of the spectrum modulated by each of the sensors and carried by said second waveguide, said spectrometer analyzing said wavelength division multiplexed spectrum including the portions of said narrow band of wavelengths modulated by the sensors;
wherein at least one of the sensors operates to vary the ratio of absorbance between wave energy having two different wavelengths passing through said sensor.

2. A system for determining the values of a plurality of sensors provided in a hostile environment, comprising:
a plurality of optical emitters, each optical emitter producing a particular narrow band of wavelengths of optical energy;
a plurality of first waveguides, each of said first waveguides orthogonally displaced from one another;
a plurality of second waveguides, each of said second waveguides orthogonally displaced from one another;
a multiplexer in connection with said plurality of optical emitters for producing a wavelength division multiplexed spectrum combining the narrow band of wavelengths produced by each of said optical emitters to be transmitted along said plurality of said first waveguides;
a plurality of optical drop taps periodically provided along at least one of said plurality of first waveguides, each of said optical drop taps associated with one of said sensors, each of said optical drop taps sensitive to the narrow band of wavelength of one of said optical emitters, thereby diverting only a narrow band of wavelengths from said spectrum to its respective sensor;
a plurality of add taps periodically provided along at least one of said second waveguides, each of said optical add taps associated with one of the sensors for receiving a signal from the sensor, modulating a narrow band of wavelengths transmitted to the sensor from one of said optical drop taps;
an n×n optical coupler provided between said plurality of optical emitters, a plurality of third waveguides producing a time division multiplexed signal including a plurality of distinct wavelengths;
a second drop tap;
a plurality of optical delay lines connected between said second drop tap and the sensors;
a second add tap connected to a plurality of fourth waveguides, each of which is transmitting a modulated signal from each of the sensors;
a signal analyzer in communication with said second add tap for analyzing said modulated signals; and a spectrometer receiving all of the wavelength division multiplexed spectrum, a portion of the spectrum modulated by each of the sensors and carried by one of said second waveguides, said spectrometer analyzing said wavelength division multiplexed spectrum including the portions of said narrow band of wavelengths modulated by the sensors, said spectrometer including a two dimensional detection array relaying wave energy output from said plurality of said second waveguides.

3. The system in accordance with claim 2, wherein at least one of said optical emitters is pulsed.

4. A system for determining the values of a plurality of sensors provided in a hostile environment, comprising:

a plurality of optical emitters, each optical emitter producing a particular narrow band of wavelengths of optical energy;

a plurality of first waveguides, each of said first waveguides orthogonally displaced from one another;

a plurality of second waveguides, each of said second waveguides orthogonally displaced from one another;

a multiplexer in connection with said plurality of optical emitters for producing a wavelength division multiplexed spectrum combining the narrow band of wavelengths produced by each of said optical emitters to be transmitted along said plurality of said first waveguides;

a plurality of first optical drop taps periodically provided along at least one of said plurality of first waveguides, each of said optical drop taps associated with one of said sensors, each of said optical drop taps sensitive to the narrow band of wavelength of one of said optical emitters, thereby diverting only a narrow band of wavelengths from said spectrum to its respective sensor;

a plurality of first optical add taps periodically provided along at least one of said second waveguides, each of said optical add taps associated with one of the sensors for receiving a signal from the sensor, modulating a narrow band of wavelengths transmitted to the sensor from one of said optical drop taps;

an n×n optical coupler provided between said plurality of optical emitters and said plurality of said first waveguides; and a spectrometer receiving all of the wavelength division multiplexed spectrum, a portion of the spectrum modulated by each of the sensors and carried by one of said second waveguides, said spectrometer analyzing said wavelength division multiplexed spectrum including the portions of said narrow band of wavelengths modulated by the sensors, said spectrometer including a two dimensional detection array relaying wave energy output from said plurality of said second waveguides, whereby the power density of said wavelength division multiplexed spectrum on all of said first waveguides is equal.

5. The system in accordance with claim 4, wherein said waveguides are optical fibers.

6. The system in accordance with claim 5, wherein said optical fibers are multimode optical fibers.

7. The system in accordance with claim 5, wherein at least one sensor is provided with a polymer waveguide.

8. The system in accordance with claim 4, wherein at least one of the sensors is a Fabry-Perot interferometer.

9. The system in accordance with claim 4, wherein at least one of the sensors is a reflecting Bragg grating.

10. The system in accordance with claim 4, wherein at least one of the sensors is an in-fiber Bragg grating.

11. The system in accordance with claim 4, wherein at least one of the sensors is a Mach-Zehnder interferometer.

12. The system in accordance with claim 4, wherein at least one of the sensors include thin film reflector elements.

13. The system in accordance with claim 4, wherein said plurality of optical emitters, said spectrometer and the sensors are provided within enclosures shielding said optical emitters, said spectrometer and the sensors from electromagnetic interference.

* * * * *